W. J. COURTNEY.
VEHICLE TIRE.
APPLICATION FILED NOV. 23, 1908.
949,060.
Patented Feb. 15, 1910.
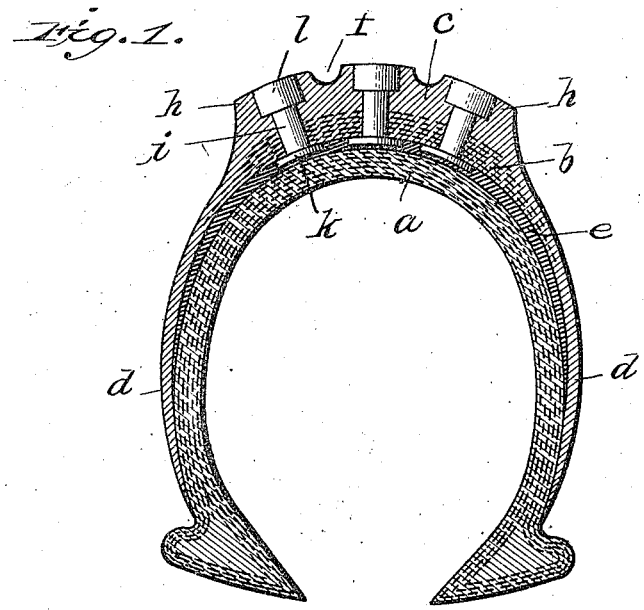
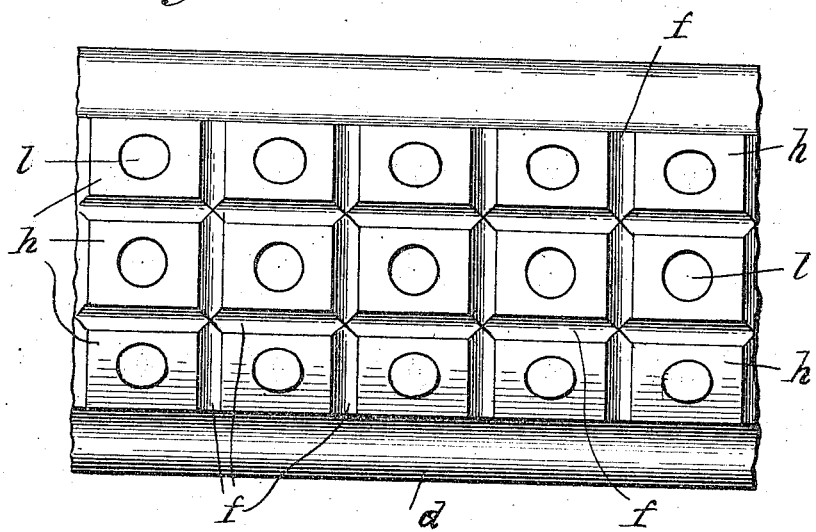
Witnesses
Edwin L. Yewell
Edwin F. Fry
Inventor
William J. Courtney
By Rasteau & Siddons
Attorneys

UNITED STATES PATENT OFFICE.

WILLIAM J. COURTNEY, OF NEW YORK, N. Y.

VEHICLE-TIRE.

949,060.  Specification of Letters Patent.  Patented Feb. 15. 1910.

Application filed November 23, 1908. Serial No. 463,964.

*To all whom it may concern:*

Be it known that I, WILLIAM J. COURTNEY, a citizen of the United States, residing at New York city, in the county and State of New York, have invented certain new and useful Improvements in Vehicle-Tires, of which the following is a specification.

The invention relates to improvements in resilient tires such as are ordinarily used upon the wheels of automobiles.

It has for its object the provision of a tread that will tend to prevent the wheels of the automobile from skidding on slippery roads and having all the effects of the uses of a chain on a tread in gripping the road, but without any of the objectionable and undesirable features of the use of a chain.

It consists in the novel construction hereinafter described, pointed out in the appended claim and illustrated in the accompanying drawings.

While the invention will be described as applied to the casing of a pneumatic tire, yet it can also be applied to other cushion tires and to solid tires.

In the drawings, in which similar reference characters designate corresponding parts, Figure 1 is a transverse sectional view of a pneumatic tire casing embodying the invention. Fig. 2 is a plan view of part of the tread.

The main part $a$ of the tire casing is of the usual laminated rubber and fabric formation. On the periphery of the casing is the tread comprising the base $b$, also of laminated rubber and fabric, and the comparatively thick crown $c$ of rubber. The edges $d$ of the tread are extended to cover the sides of the casing to protect the same and to aid in holding the tread in place. Interposed between the tread and the main part of the casing is the rubber diaphragm $e$. In the face of the crown of the tread, extending longitudinally and transversely through the same, are the grooves $f$ intersecting each other. These grooves are of considerable depth and divide the crown into the rectangular spurs $h$. Passing through the spurs are the studs $i$ having bases $k$ embedded in the diaphragm $e$ and cylindrical heads $l$ embedded in the spurs. As the diameters of the bases $k$ and the heads $l$ are much greater than the shanks of the studs, the latter will be strongly held in place. The studs $i$ are embedded in the canvas and rubber, flush with the surface of the tread. The studs give rigidity to the spurs to increase the penetrative power of the latter and so that they will withstand lateral strain. The bases $k$ not only serve to hold the studs in place, but being embedded in the rubber diaphragm $e$ give a cushioning effect to the studs. The diaphragm backed by the body part $a$ of the tire tends to force the studs outwardly, as they wear down, when the surrounding material of the tread is compressed by the load.

A wheel equipped with the tire of the foregoing description is particularly adapted to travel on slippery roads to prevent skidding. The exposed crown $c$ engages the road material and the spurs $h$ form a series of projections or teeth that readily penetrate the loose soft outer surface of the road and engage the hard stationary material beneath. The studs $i$ not only give rigidity and penetrative power to the spurs, but through the compression of the material around them they project beyond the face of the crown and penetrate the loose soft surface of the road and grip the hard fixed material beneath.

Having thus described my invention, what I claim and desire to secure by Letters Patent is,

In a resilient tire, a main body part, a tread of elastic material secured to said body part comprising an integral base and a comparatively thick exposed crown, said crown having comparatively deep intersecting grooves to form spurs in its face, layers of fabric incorporated in the base of the tread, a rubber diaphragm interposed between the body part and the tread, studs passing through said spurs and the laminated base of the tread, enlarged heads on the outer ends of the studs embedded in said spurs, and enlarged bases on the inner ends of said studs interposed between said diaphragm and the inner face of the tread.

In testimony whereof I hereunto affix my signature in the presence of two witnesses.

WILLIAM J. COURTNEY.

Witnesses:
JOHN G. PHEIL,
SETH BIRD.